Patented Apr. 18, 1950

2,504,153

UNITED STATES PATENT OFFICE 2,504,153

SULFUR COLORS OF NOVEL SHADES AND METHOD OF PREPARING THE SAME

Gordon Bradbury Robbins, Pennsgrove, N. J., assignor to E. I. du Pont de Nemours & Company, Wilmington, Del., a corporation of Delaware No Drawing. Application October 7, 1948, Serial No. 53,385

9 Claims. (Cl. 260—128)

This invention relates to novel sulfur colors and to a method of preparing the same. For the purpose of this invention, a "sulfur color" may be defined as one soluble in aqueous sodium sulfide, and capable of being applied to fabric by the standard sulfur dye procedure, that is by vatting in an aqueous sodium-sulfide bath, followed by oxidation on the fiber to the insoluble form.

It is known that sulfur dyes are relatively scarce in those portions of the spectrum ranging from orange, through red, to violet. On the other hand, sulfur dyes generally possess the advantages of being easily reducible, hence easily applicable to textile material, and of yielding furthermore, fast dyeings of good brightness qualities.

Accordingly, it is an object of this invention to produce new sulfur colors of good tinctorial qualities and of desirable shades, especially in the range of violet to red. Further important objects of this invention will become apparent as the description proceeds.

Sulfur dyes in general possess properties which make them very desirable for commercial purposes. Outstanding among these properties, aside from their low cost, is their relative ease and economy of application. Thus, whereas anthraquinone vat dyes require relatively expensive reducing agents (sodium hydrosulfite) and very careful control of dyeing conditions in order to obtain level dyeings, sulfur dyes are reduced easily by cheap reagents (sodium sulfide) to give level dyeings with a minimum amount of attention to conditions of application. The dyeings from sulfur dyes, though not so fast to light and bleach as the anthraquinone vat dyes, are nearly as fast to washing. The light fastness of sulfur dyes is very good, however, compared to azo dyes, and their wash fastness is much superior to that group. Thus, sulfur dyes answer a definite need for inexpensive dyes of moderately good light fastness combined with very good wash fastness. Finally, sulfur colors are generally marketed in powder form which dissolves readily in the sodium sulfide vat; hence sulfur colors are convenient to transport and to store.

It is clear from the aforegoing considerations that the lack of sulfur colors in certain ranges of the spectrum constitutes a practical want of great commercial significance. It is not merely that the absence of a sulfur red, for instance, deprives the textile manufacturer of the privilege of producing red dyed textiles by the aid of sulfur dyes. But even of greater commercial significance is the fact that the textile dyer is handicapped when he desires to shade available sulfur colors in the direction of red.

Thus, textile dyers, as a rule, do not find it convenient to limit their production to colors or shades available by the marketed dyestuffs of a given class (say sulfur colors). More often, the artist's design calls for the use of a color which is a shade different, one way or another, from a given standard product. To meet the requirement, the given color has to be shaded with another color.

Furthermore, when it is desired to shade say a blue into a reddish-blue, the obvious expedient of adding a red color to the blue is not in practice the best, inasmuch as the brightness of the color may suffer from mixing such diverse shades. A more practical expedient is to shade the blue with a violet; in other words, it is preferable to have the shading color as near as possible to the principal color, so as to avoid undue dullness in the resulting mixture.

The production of sulfur colors which would fill out the missing ranges in the spectrum thus becomes an economic problem not only on its own merit, but also because it would enhance the utility of those ranges of the spectrum which are now available in this field. In spite of its importance, however, this problem has not to my knowledge been solved to date. Red shades in sulfur colors have come to be looked upon by experts as an almost unattainable ideal, while the neighboring ranges of orange and violet have been but poorly satisfied in the art to date.

To the extent that allusion to such colors may be found in the literature, they either require expensive initial materials or complex processes of production, or the resulting color is dull or of very low tinctorial power, making the color highly uneconomical for practical use.

Now, I have found that sulfur colors of red and violet shades and of exceptionally high tinctorial qualities may be readily obtained by treating colors of the dioxazine series with the complex agent resulting from fusion of aluminum chloride with sulfur monochloride.

The dioxazine type coloring matters which may be thus converted according to this invention, may be defined generally as triphendioxazine pigments; in other words, they are compounds containing in their structure the configuration

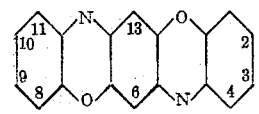

and being free of water-solubilizing groups such as sulfo or carboxy, wherefore they are water-insoluble. The free positions of the several homocyclic rings may be satisfied by hydrogen or may carry various other inert substituents. Thus, the positions marked 6 and 13 may be satisfied by chlorine, bromine, or methyl. The positions marked 1, 2, 3, 4, 8, 9, 10, 11 may carry various substituents such as halogen, methyl, methoxy, phenyl, phenoxy, and the like. Again, any adjacent pair of the last-mentioned positions may form part of an additional homocyclic or heterocyclic ring, as for instance in dinaphtho-phen-dioxazine,

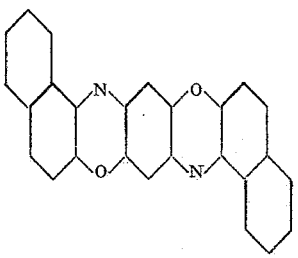

in dicarbazole-phen-dioxazine,

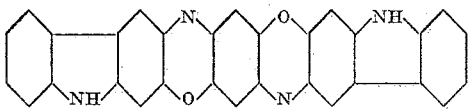

etc.

Altogether then, the dioxazine compounds which may be subjected to treatment with the aluminum-chloride-sulfur-monochloride complex according to this invention may be represented by the general formula

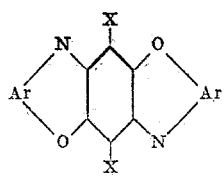

wherein X, X stand for hydrogen, halogen or alkyl and Ar, Ar designate aromatic radicals selected from the group consisting of the benzene nucleus; benzene nuclei carrying various inert and non-solubilizing substituents such as halogen, methyl, methoxy, aryl and aryloxy; and benzene nuclei which form part of a larger polycyclic complex, whether homocyclic as in naphthalene or fluorenone or partially heterocyclic as in carbazole, furane, etc.

To express the above idea in still different words, the dioxazines which may be treated according to this invention are those obtainable by ring-closing the diarylamines in turn obtained by condensing benzoquinone, dichloroquinone, trichlormethyl quinone, chloranil or bromanil on the one hand, with any amino aromatic compound whatsoever which is free of SO₃H groups and COOH groups, but which contains the amino group in a benzene ring and contains hydrogen, alkoxy or phenoxy in position ortho to the amino group.

The application of an aluminum chloride-sulfur monochloride complex to various organic compounds, especially coloring matters, to convert the same into sulfur dyestuffs (that is dyestuffs vattable by the air of sodium sulfide in an alkaline bath) is per se not novel. A general process to this effect has been described and claimed in U. S. Patent No. 2,369,666, issued to A. L. Fox. But the said patent was not particularly concerned with filling the gaps in the spectrum of sulfur colors in the regions above indicated, and there was no teaching in the patent that application of the process to coloring compounds of the dioxazine type would produce the wanting shades of red and violet, coupled with exceptionally high tinctorial strength and brilliance.

The aluminum chloride-sulfur monochloride complex to be used in the instant invention may be prepared according to the teachings of said U. S. Patent No. 2,369,666. More particularly, it may be prepared by heating the two reagents together in suitable proportions by weight. One of the commonest addition products thus obtained is a complex of constitution AlCl₃2S₂Cl₂, whose specific gravity referred to water is 1.784 (Ruff and Golla, Zeit. f. anorg. u. algem. Chemie, vol. 138, pages 17–32; Zentralblatt, 1924, II, 1570). However, up to certain limits an excess of sulphur monochloride may be employed with the above complex, with the result that the reaction product may contain a larger proportion of chlorine, but is otherwise of the same general nature as in the preferred embodiments of this invention. Large excesses of free sulfur monochloride, however, tend to reduce the quantity of vattable color obtained.

The characteristic of the novel compounds obtained according to this invention is that they are colored bodies of the sulphur dyestuff class. In other words, they may be reduced with aqueous sodium sulphide to produce a "sulphur dye vat," which has affinity for textile fiber, and which may be oxidized on the fiber into dyeings of good fastness qualities. Presumably, the novel compounds contain disulphide groups, —S—S—, which are reduced by the alkaline sulphide vat to mercapto groups: —SH. The new dyestuffs generally also possess combined chlorine, thereby distinguishing from known sulphurized dyestuffs obtained by subjecting dyestuffs and intermediates of the above classes to sulphurization treatments by standard methods of the prior art.

The crude reaction products of this invention are isolated by drowning the reaction mass in ice water and may be purified by extraction with dilute alkali. This dissolves the aluminum as sodium aluminate and converts any precipitate of sulphur to sodium sulphide or sodium sulphhydrate. It has been found that many of the sulphur colors made by this procedure are so easily vattable with sodium sulphide that the sodium sulphide produced in the action of the sodium hydroxide on the sulphur in the drowned crude product causes the colors to vat; consequently, in some cases it is necessary to isolate the sulphur color by an oxidative procedure, such as blowing with air or treatment with an oxidizing agent. However, many of the other dyes formed are not vatted by the low concentration of sodium sulphide formed in the extraction and may be isolated directly by filtration. For the purpose of analysis, the crude materials purified by extraction with caustic may be further extracted with carbon disulphide to remove any free sulphur.

The following examples are given to illustrate this invention, without any intent however to limit my invention to the details of procedure. Parts mentioned are by weight.

PART A.—PREPARATION OF THE ALUMINUM-CHLORIDE-SULPHUR-CHLORIDE COMPLEX 162 parts of sulfur monochloride and 80 parts of anhydrous aluminum chloride are stirred together at 80–100° C. for several hours or until reaction is complete. The liquid complex which is formed, can be stored in the absence of moisture for future use.

Part B.—Preparation of Novel Sulfur Colors

Example 1

1 part of 6,13-dichloro-triphendioxazine (prepared by ring-closure of the diarylamino-quinone from o-anisidine and chloranil in nitrobenzene by the aid of an acylating agent such as benzoyl chloride) is heated to 120° C. in 17.5 parts of the complex prepared in Part A. The mixture is drowned in 100 parts of ice water containing 5 parts of hydrochloric acid, and is stirred until the excess of aluminum chloride-sulfur chloride complex is decomposed. The drowned mass is filtered and the filter cake is washed with water to remove most of the acid and salts. The material is then extracted with 150 parts of water at 80–90° C., adding caustic soda to hold slight alkalinity on Clayton Yellow paper until most of the sulfur (which has formed in the decomposition step) is dissolved. At this time, if bleeding of the color into the liquid occurs due to vatting of the dye, the product may be isolated by blowing with air or by addition of small amounts of sodium bisulfite till the dye is all out of solution as indicated by a spotting of the mixture on filter paper. The dye is filtered, washed alkali free and dried at 70–80° C.

The product can be vatted and dyed with sodium sulfide by procedures normally used in the application of sulfur colors. It dyes cotton an attractive red-violet shade from a pale yellow vat. Normal chrome-and-acetic after-treatment is preferred for obtaining the most desirable shade.

Example 2

1 part of 3,6,10,13-tetrachloro-triphendioxazine (prepared by ring-closure of the diarylaminoquinone from 2-methoxy-5-chloro-aniline and chloranil) is reacted with 17.5 parts of the complex prepared in Example 1 at 135–140° C. for one hour. The dye is isolated in the manner described in Example 1.

The product dyes cotton a red-violet shade by normal dyeing procedures as described in Example 1.

Example 3

2,6,9,13-tetrachloro-triphendioxazine (prepared by ring-closing the diarylamino-quinone obtained from p-chloro-aniline and chloranil, by the aid of phosphorus pentachloride and benzoyl chloride in nitrobenzene) is treated in the same way as described in Example 2.

The product is similar except that it dyes a somewhat bluer shade of violet.

Example 4

1,4,6,8,11,13-hexachloro-triphendioxazine (prepared by ring-closing the diarylamino-quinone obtained from 2,5-dichloro-aniline and chloranil, as above) is treated as in Example 2 to yield a product which dyes cotton a somewhat duller shade of violet.

Example 5

3,10-dimethyl-6,13-dichloro-triphendioxazine (prepared by ring-closing the diarylamino-quinone obtained from 2-methoxy-5-methyl-aniline and chloranil) is treated in the same manner as Example 1 to yield a product which dyes cotton a rather dull violet.

Example 6

1 part of 2,9-diphenyl-6,13-dichloro-triphendioxazine (prepared by ring-closing the diarylamino-quinone obtained from 4-amino-biphenyl and chloranil) and 17.5 parts of the complex prepared in Part A are reacted at 75–80° C. for one-half hour, and the dye is isolated as in Example 1.

The product dyes cotton a bright reddish violet.

Example 7

3,10-diphenyl - 6,13 - dichloro-triphendioxazine (prepared by ring-closing the diarylamino-quinone obtained from 3-amino-4-methoxy-biphenyl and chloranil) is treated as in Example 6 to yield a product which dyes cotton an attractive red shade.

Example 8

2,9 - di(p - bromo - phenyl) - 6,13 - dichloro-triphendioxazine (prepared by ring-closing the diarylamino-quinone obtained from 4-amino-4'-bromo-biphenyl and chloranil) is treated as in Example 6 to yield a product which dyes cotton a reddish violet.

Example 9

2,9 - dibenzoyl - 6,13 - dichloro - triphendioxazine (prepared by ring-closing the diarylamino-quinone obtained from p-amino benzophenone and chloranil) is treated as in Example 1 to yield a product which dyes cotton a dull bordeaux.

Example 10

2,9 - di(p- - acetylamino - m - methoxy - phenyl) - 6,13 - dichloro - triphendioxazine (prepared by ring-closing the diarylamino-quinone obtained from monoacetyl-dianisidine and chloranil in trichloro-benzene by the aid of benzoyl chloride) is treated as in Example 2 to yield a product which dyes cotton a reddish violet.

Example 11

1 part of 3,10-dimethoxy-6,13-dichloro-triphendioxazine (prepared by ring-closing the diarylaminoquinone obtained from 2,5-dimethoxy aniline and chloranil) is treated at 90–100° C. for one hour with 17.5 parts of the complex prepared in Part A. The product which is isolated as described in Example 1, dyes cotton a dull violet.

Example 12

1 part of 2,9 - diphenoxy - 6,13 - dichloro - triphendioxazine (prepared by ring-closing the diarylamino-quinone obtained from 4-amino-diphenyloxide and chloranil) is treated at 60–65° C. for one-half hour with 17.5 parts of the complex as prepared in Part A. The product, which is isolated as in Example 1, dyes cotton a bright reddish violet.

Example 13

The dioxazine of the formula

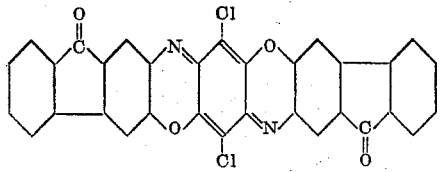

(prepared by ring-closing the diarylamino-quinone obtained from 2-amino-fluorenone and chloranil) is treated as in Example 10 to yield a product which dyes cotton a dull violet.

Example 14

The dioxazine of the formula

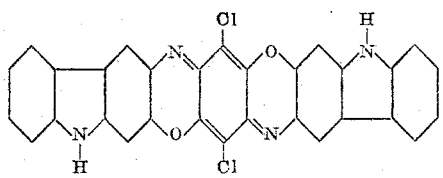

(prepared by ring-closing the diarylamino-quinone obtained from 3-amino-carbazole and chloranil) is treated as in Example 2 to yield a product which dyes cotton a reddish blue.

Example 15

The dioxazine of the formula

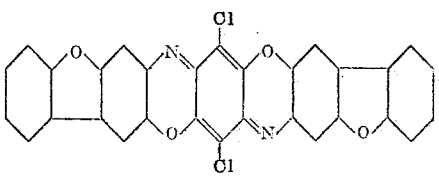

(prepared by ring-closing the diarylamino-quinone obtained from 3-amino-dibenzofuran and chloranil) is treated as in Example 7 to yield a product which dyes cotton a bright bluish violet shade.

Example 16

3,10-dichloro-triphendioxazine (prepared by ring-closing the diarylamino-quinone obtained from 2-methoxy-5-chloroaniline and quinone) is treated as in Example 2 to yield a product which is similar to Example 2 but dyes cotton a slightly bluer shade.

Example 17

2,9 - diphenyl - 6,13 - dibromo - triphendioxazine (prepared in the same manner as the starting material in Example 6 except that bromanil is substituted for chloranil) is treated as in Example 6 to yield a product which is very similar to that from Example 6.

Example 18

The dioxazine of the formula

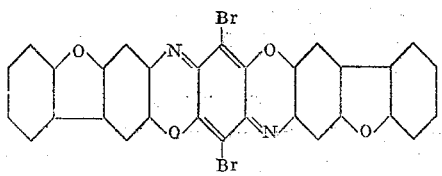

(prepared as in Example 15, except that bromanil is substituted for chloranil) is treated as in Example 15 to give a dye of a similar shade to that example.

Example 19

2,9 - diphenyl - 6,13 - dichloro - triphendioxazine (1 part) is suspended in 20 parts of carbon tetrachloride and 2.6 parts of sulfur chloride-aluminum chloride complex is added. The mixture is refluxed for 16 hours. It is filtered and the solid is washed with alcohol. The product is extracted with dilute hydrochloric acid, filtered and washed with water. It is then dried. The material dyes cotton a shade similar to the product of Example 6.

It will be understood that the above examples are merely illustrative, and that the details of procedure may be varied widely within the skill of those engaged in this art. Thus, while most of the reactions have been run using excess complex as flux for the reaction, any solvent or diluent which is inert to the complex may be used, e. g. carbon tetrachloride, providing the required temperature is obtainable, as more fully discussed below.

In the absence of an extraneous diluent, the minimum quantity of sulfurizing complex required is that which will give a stirrable reaction mass. When a diluent is employed, the quantity of complex may be cut down considerably, but it is desirable to maintain at least 2 moles of $AiCl_3.2S_2Cl_2$ per mole of dioxazine color employed.

In Example 1, sodium hydroxide solution was used to extract the sulfur formed in the decomposition step; in lieu of this, caustic potash may be employed. Alternatively, the washed filter cake following the drowning step (and comprising color and sulfur) may be slurried in sodium sulfite solution, which likewise dissolves the sulfur but leaves the color undisturbed. The latter is then filtered off, washed and dried as in Example 1.

The ring-closure of the various diarylamino-quinones to the corresponding triphen-dioxazines has been alluded to but briefly in the above examples, since it follows standard and well known procedures. See for instance U. S. Patents 2,082,344 (Kranzlein et al.) and 2,092,387 (Brunner et al.).

One such standard procedure involves removal of two H-atoms for each oxazine ring formed, which may be achieved simply by heating the diarylamino-quinone in an oxidizing solvent such as nitrobenzene. In another procedure, the initial diarylamino-quinone contains a methoxy, ethoxy or phenoxy group ortho to the imino group, and in these cases the ring-closure involves splitting off methyl alcohol, ethyl alcohol or phenol, and may be achieved by heating the compounds with an acylating agent (e. g. benzyl chloride) in a solvent. Sulfuric acid and oleum should be avoided as ring-closing agents, because they would introduce sulfonic acid groups into the dioxazine compound. Such groups would tend to render the final product water-soluble and hence of poor fastness to washing.

The vatting and application to the fiber of the novel compounds of this invention may likewise follow standard procedure as applied to sulfur dyestuffs generally. Sodium sulfide is employed as vatting agent, preferably in the presence of sodium carbonate. The fibers are impregnated with the aqueous vat at elevated temperature (say 150° to 200° F.), then rinsed and oxidized by exposure to the atmosphere or by treatment in a dilute bath of a customary vat oxidizing agent such as sodium bichromate plus acetic acid, or sodium perborate. However, for the sake of completeness, and without limiting the invention thereby, a few specific illustrations are given hereinbelow.

PART C.—APPLICATION TO THE FIBER

Example 1C

A dye bath is made up at 180° F. containing 50 mg. of the dyestuff prepared in Example 6, 0.2 gm. of sodium carbonate, 1 gm. of sodium sulfide and water sufficient to bring the total volume to 260 cc. 12 cc. of a 25% solution of sodium chloride are now added, and 10 gm. of a cotton skein are treated in the bath for a period of 45 minutes. The fiber is then squeezed out, exposed to the air for 10 minutes, and treated for 20 minutes in a bath containing 0.2 gm. of sodium dichromate and 0.4 gm. of acetic acid in 200 cc. of water at 140° F.; finally, the chromed fiber is rinsed and dried.

In using my novel colors as shading colors for known sulfur dyestuffs, the procedure is essentially the same. Typical examples are as follows:

Example 2C

A dye bath is made up as in Example 1C, except that the color therein is replaced by 70 mg. of the blue sulfur dye obtained by alcoholic thionation of 4-amino-3-methyl-4'-hydroxy-diphenylamine according to U. S. Patent 709,151 and 20 mg. of the dyestuff obtained in Example 15 hereinabove. When applied to cotton by the procedure set forth in Example 1C, a redder blue dyeing is obtained than that which results from the use of the first mentioned of the above two dyes alone.

Example 3C

The procedure of Examples 1C and 2C is followed, except that the dye here consists of 450 mg. of a brown sulfur dye obtained by thionation of 2,7-dimethyl-3,6-diamino-acridine according to U. S. Patent 1,165,531 and 30 mg. of the dyestuff obtained in Example 7 above. An attractive brown dyeing results upon cotton, which is redder and brighter than the shade obtainable by using the first mentioned of the above two dyes alone.

In all the above examples, the sulphur-chloride-aluminum-chloride complex employed was the one prepared in Part A of this specification, wherein one mole of aluminum chloride was condensed with a slight excess over two moles of sulphur monochloride at elevated temperature and in the absence of a solvent. (Its constitution is presumed to be $AlCl_3.2S_2Cl_2$.) However, such precise conditions need not be adhered to, and larger excesses or even deficiencies of sulphur-monochloride may be employed in preparing the complex, since obviously the resulting reaction mass will contain the complex addition compound at least to some extent, with an excess of either free sulphur-monochloride or aluminum chloride. The principal condition to be observed in forming the complex is to react the two ingredients at elevated temperature, say between 50° and 135° C., and in the absence of a solvent, to insure reaction between the aluminum chloride and sulphur-monochloride with formation of the compound $AlCl_3.2S_2Cl_2$ to the extent that the laws of equilibrium will permit under the circumstances.

It will also be clear from the examples that the exact analysis of the product, especially as to S and Cl content, may be varied considerably by varying the conditions of the reaction, such as temperature, duration, and presence or absence of diluents and condensing agents. The latter two factors have already been discussed. But as for temperature and duration, these generally counterbalance each other. In other words, the higher the temperature the quicker the reaction is completed, and vice versa. As indicated by some of the examples above, temperatures as low as 60° C. or as high as 140° C. are customarily employed. The reaction may also be effected at room temperature by stirring the mixture of dioxazine dyestuff and sulfurizing complex for a considerable period, say 24 hours. In the average case, however, I prefer to employ temperatures between 80° and 130° C., thereby shortening the reaction period to a few minutes, or at most a few hours. In general, I recommend carrying out the reaction with the aluminum-chloride-sulphur-monochloride complex at the highest temperature found practicable without causing excessive dissociation of the dyestuff being treated or of the complex itself.

Many other permissible variations in details of procedure without departing from the spirit of this invention will be apparent to those skilled in the art.

I am aware that the thionation of dioxazine colors has been attempted in the art heretofore, more especially by subjecting dioxazine colors to a sulfur or sodium-sulfide melt at elevated temperature (200°–250° C.) for several hours. I find, however, that the products produced according to said prior attempts are entirely different from those of my invention, and are as a rule grays, blues and bluish violets (compared to my violets and reds), of poor wash fastness, and of very low tinctorial power. It is probable that the above differences in results are accompanied by and are due to actual differences in structure of the resulting compounds. For, it will be noted that the thionation according to my invention is generally effected under relatively mild conditions (lower temperature, shorter heating period) compared to those of the aforementioned attempt. Also, there is reason to believe that my process introduces chlorine atoms into the molecule, in addition to sulfide or mercapto groups. Thus, the product of Example 6 is found by analysis to contain 2.38 atoms of chlorine for each 2 atoms of nitrogen; the product of Example 7 analyzes 3.1 atoms of Cl for each 2 atoms of N. The excess over 2 Cl atoms in each case represents the gain due to the special treatment according to this invention.

I claim as my invention:

1. Sulfur and chlorine containing dyestuffs obtained by reacting with an aluminum-chloride-sulfur-monochloride complex addition compound of constitution $AlCl_3.2S_2Cl_2$ upon a water-insoluble compound of the triphen-dioxazine series, said dyestuffs being characterized by dyeing cotton from a sodium sulfide vat in violet to red shades.

2. Sulfur and chlorine containing dyestuffs obtained by reacting with an aluminum-chloride-sulfur-monochloride complex addition compound of constitution $AlCl_3.2S_2Cl_2$ upon a compound of the general formula

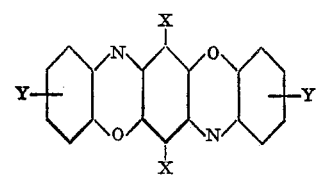

wherein X stands for a member of the group consisting of hydrogen, halogen and methyl, and Y designates a member selected from the group consisting of hydrogen, halogen, alkyl, alkyloxy, aryl, aroyl and aryloxy, said dyestuffs being characterized by dyeing cotton from a sodium sulfide vat in violet to red shades.

3. The sulfur dyestuff obtained by reacting $AlCl_3.2S_2Cl_2$ with a Bz, Bz'-diphenyl-triphendioxazine.

4. The sulfur dyestuff obtained by reacting $AlCl_3.2S_2Cl_2$ with 2,9-diphenyl-6,13-dichloro-triphendioxazine.

5. The sulfur dyestuff obtained by reacting $AlCl_3.2S_2Cl_2$ with 3,10-diphenyl-6,13-dichloro-triphendioxazine.

6. The sulfur dyestuff obtained by reacting $AlCl_3.2S_2Cl_2$ with the triphendioxazine compound of the formula

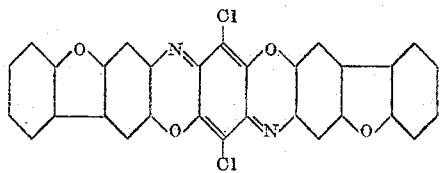

7. The process of producing a sulfur dyestuff which comprises reacting upon a water-insoluble triphendioxazine coloring compound with an aluminum - chloride - sulfur - monochloride complex corresponding to the constitution $AlCl_3.2S_2Cl_2$.

8. The process of producing a sulfur dyestuff which comprises heating a water-insoluble triphendioxazine coloring compound with an aluminum - chloride - sulfur - monochloride complex corresponding to the constiution $AlCl_3.2S_2Cl_2$ at a temperature between 60° and 140° C.

9. The process of producing a sulfur dyestuff which comprises heating a water-insoluble triphendioxazine coloring compound with an aluminum - chloride - sulfur - monochloride complex corresponding to the constitution $AlCl_3.2S_2Cl_2$, treating the reaction product with an alkali-metal hydroxide to remove excess sulphur and aluminum, and recovering the vattable sulphur color.

GORDON BRADBURY ROBBINS.

REFERENCES CITED

The following references are of record in the file of this patent:

UNITED STATES PATENTS

| Number | Name | Date |
|---|---|---|
| 2,369,666 | Fox | Feb. 20, 1945 |